March 19, 1935.  F. W. LARKWORTHY  1,994,774
DRAGLINE ARRANGEMENT
Filed Nov. 4, 1933   2 Sheets-Sheet 1
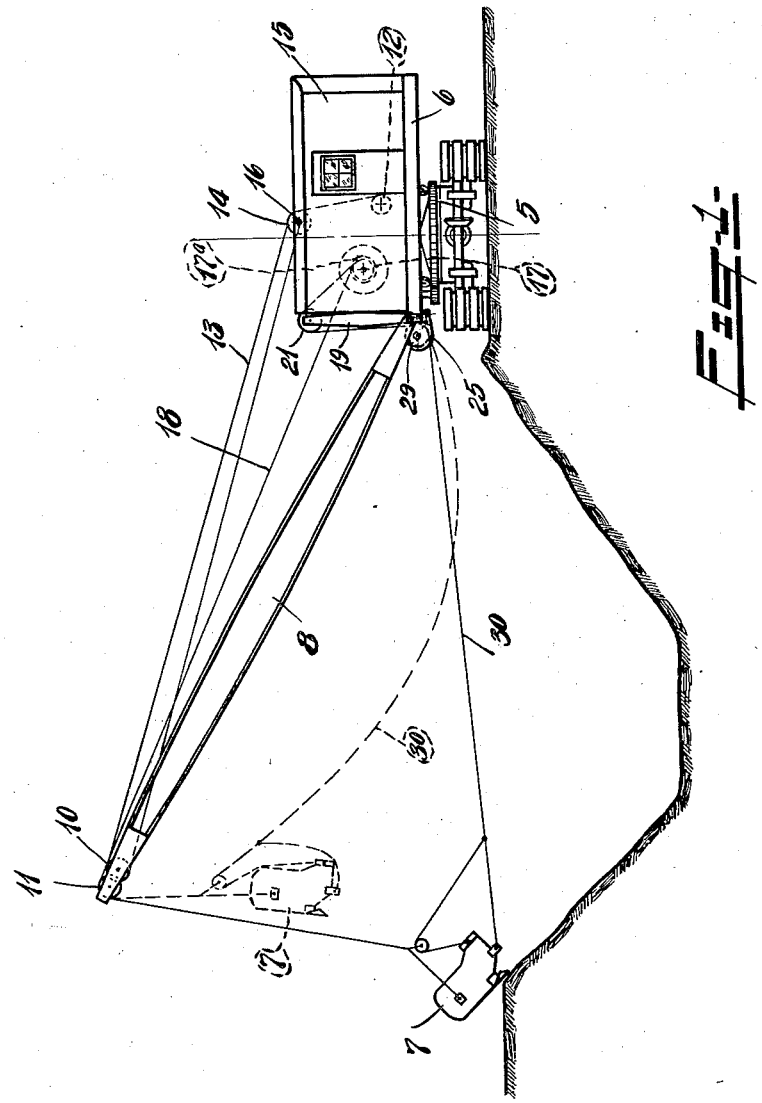
INVENTOR
Fred W. Larkworthy
BY
Frank C. Seaman
ATTORNEY

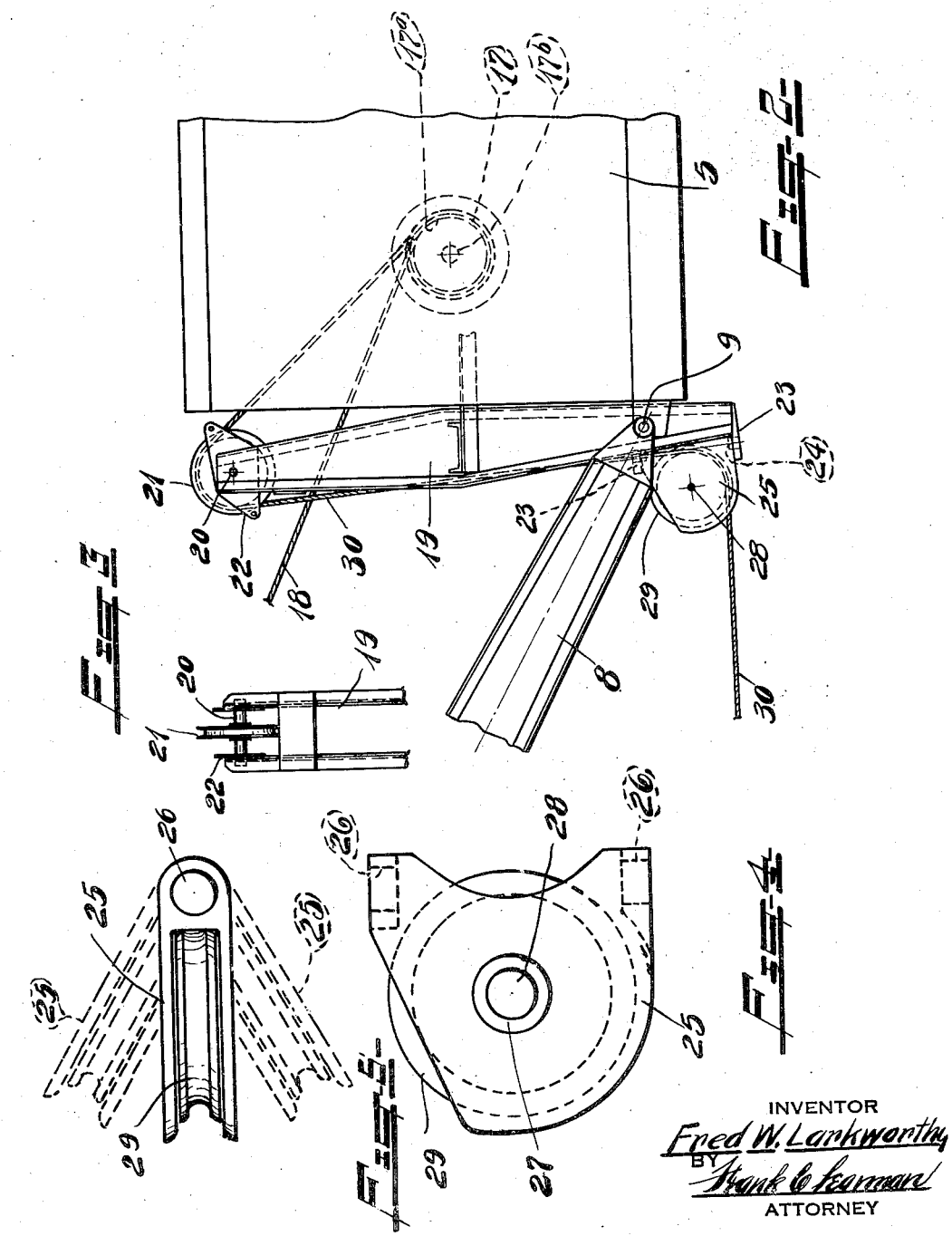

Patented Mar. 19, 1935

1,994,774

UNITED STATES PATENT OFFICE 1,994,774

DRAGLINE ARRANGEMENT

Fred W. Larkworthy, Bay City, Mich., assignor to Industrial Brownhoist Corporation, Bay City, Mich., a corporation of Ohio Application November 4, 1933, Serial No. 696,655

3 Claims. (Cl. 37—116)

This invention relates to the general arrangement of the guide sheaves such as are employed with a drag bucket operated in connection with a conventional tractor, crane, shovel, or excavating machine.

The prime object of the invention is to provide a novel arrangement of guiding sheaves for directing and guiding the drag line, which easily and smoothly adapt themselves to the various positions which the drag line is required to assume in use, so that it will be subjected to a minimum wear, and eliminate kinking and short return bends.

A further object is to design a fair lead including a mast and sheave arrangement which relieves the boom of all drag line stresses, and which can be built as a separate unit for application to standard machines already in use, as well as for application to new machines in the process of manufacture.

Another object is to provide a simple and economical arrangement of guide sheaves which readily accommodate themselves to any angular relationship or position in which the bucket may be placed, without binding, fouling, or kinking the drag line.

The above and other objects will appear as the specification progresses, reference being had to the accompanying drawings in which I have shown the preferred embodiment of my invention, and in which like reference numerals indicate like parts throughout the several views thereof.

In the drawings—

Fig. 1 is a side elevation of a full revolving tractor crane, with my improved sheave arrangement in position thereon, the broken lines showing the bucket in raised position.

Fig. 2 is an enlarged fragmentary side elevation of the tractor crane illustrating the sheaves and drag line.

Fig. 3 is a fragmentary front elevation of the top of the mast.

Fig. 4 is an enlarged detail side view of the swivel bracket and sheave.

Fig. 5 is an enlarged plan view thereof, the broken lines showing it in various adjusted positions.

In the drawings the numeral 5 represents a conventional tractor crane or shovel which is adaptable for various kinds of work. This is provided with a turntable 6 as usual, the present illustration showing it equipped with a drag bucket 7 for drag line work; a boom 8 is hingedly connected to the turntable at the point 9, and sheaves 10 and 11 respectively are provided on the outer end of the boom as usual.

A winding drum 12 is journaled in suitable bearings (not shown) provided on the turntable, and a boom hoist line 13 is wound thereon, this line leading up and over a sheave 14 which is mounted on the cab 15, thence being trained around the sheave 10 which is mounted on the free end of the boom, and thence leading back and being anchored to the cab 15 at the point 16, and it will be obvious that the boom can be raised or lowered by rotation of the winding drum 12.

A pair of hoist drums 17 and 17$^a$ respectively are clutched to a shaft 17$^b$ which is journaled on the turntable, and a hoist cable 18 is wound on the drum 17$^a$, said cable leading up and over the sheave 11, thence down and being anchored to the drag bucket 7 as usual.

A mast 19 is rigidly secured to the front end of the frame, and a horizontally disposed shaft 20 is mounted on the upper end thereof, a fleeting sheave 21 being journaled on said shaft, and guides 22 prevent overriding or fouling of the drag line which is trained thereover, this sheave automatically shifting as the angle of pull is changed, and I wish to direct particular attention to the fact that the height of the mast or other support is important in that it permits the intermediate sheave 21 to be so positioned as to insure the drag cable winding properly on the drum 17.

Spaced apart bracket supports 23 are rigidly secured to the lower end of the mast, and include the pintles 24 which are formed integral therewith, the upper pintle being bored to accommodate the drag line. A swivel bracket 25 is interposed between said supports, said bracket being also provided with vertically disposed bearings 26 which when in assembled position are in direct vertical alignment with the pintles 24, these pintles serving to pivotally connect the swiveled bracket to the supports, so that the bracket is capable of free swinging movement laterally, and as indicated by broken lines in Fig. 5 of the drawings.

Horizontally disposed bearings 27 are provided in the side walls of the swivel bracket, and a pin 28 is mounted therein, a sheave 29 being journaled on said pin in the usual manner.

The drag line 30 is wound on the drum 17, thence leading up and over the fleeting sheave 21, thence down and around the sheave 29 which is mounted in the swivel bracket 25, and thence out to a suitable and well known connection with the drag bucket as illustrated in Fig. 1.

It will be noted that the mast 19 is of considerable height so as to provide maximum cable travel distance, following between the drum 17 and the sheave 29, which reduces the angle of pull accordingly, and as the cable is wound on the drum, the fleeting sheave automatically shifts to suit, eliminating any overriding or any fouling or shredding of the cable against the rim of the sheaves.

The operation of the drag mechanism is as follows: When the drag bucket is in position as shown in solid lines in Fig. 1 of the drawings, the drum 17 is actuated to drag the bucket inwardly along the face of the excavation toward the machine until the bucket is loaded, the hoist cable 18 being slacked off accordingly.

As the bucket approaches the inner end of the boom, it assumes an upright load carrying position, at which time the drum 17ª is rotated, causing the bucket to travel upwardly (see broken line position "B" in Fig. 1).

When the bucket has been raised the necessary distance, the boom is swung by means of the turntable mechanism until the bucket is spotted over the dumping spot, or over a truck or other conveying means, whereupon by a slacking of the drag line the bucket empties by gravity, assuming position as shown by broken lines in Fig. 1, after which the hoist line is slacked and the bucket lowered at the proper point where it is desired to load.

For ideal operation, the normal position of the bucket should be always in the vertical plane of the boom, but experienced operators manipulate the turntable so that its motion overlaps the cable operated actuation of the bucket which ofttimes results in considerable horizontal angularity of the drag line with respect to the boom; this shortens the life of the drag line, as the side pull causes it to rub, fray, and wear.

Various expedients have been devised for eliminating the difficulties above mentioned, but these are mostly too complicated and expensive, present considerable opportunity for the cable to foul, and also shorten the life of the drag cable.

My improved arrangement eliminates the difficulties above mentioned, is simple and economical, it insures proper winding on the drag line drum, it effectively guides the drag line in any possible working position of the bucket with relation to the boom, and can be built as a separate unit for application to any standard machine.

What I claim is:

1. A guide structure of the class described including a vertically disposed mast, a shaft on the upper end thereof, a fleeting sheave journaled on said shaft and shiftable horizontally thereon, vertically spaced bracket supports on the lower end of the mast, a swivel bracket pivotally mounted on said brackets, a sheave journaled in said bracket, said bracket being freely revoluble in a horizontal plane about the pivoting point thereof.

2. A drag line arrangement comprising a main frame including a turntable, a boom hingedly connected to the turntable, a winding drum mounted on said turntable adjacent the boom, a vertically disposed mast, a fleeting sheave journaled on the upper end thereof, a swivel bracket pivotally mounted in the lower end of the mast, and a sheave journaled therein, a bucket adjustably suspended from the free end of the boom, and a drag line wound on said drum and trained over said fleeting sheave and swivel bracket and anchored to said bucket, said fleeting sheave being automatically and horizontally shiftable on said mast to suit the angle of cable pull.

3. A drag line arrangement comprising a turntable, a boom hinged at its one end to said turntable, a winding drum on the main frame directly adjacent the foot of the boom, a vertically disposed mast, a fleeting sheave journaled on the upper end of the mast, vertically spaced bracket supports on the lower end of the mast, a swivel bracket pivotally mounted in said supports and freely revoluble in a horizontal plane, and a drag line wound on said drum and trained over said fleeting sheave and swivel bracket sheave and anchored to the bucket, said fleeting sheave automatically shifting horizontally to suit the angle of cable pull.

FRED W. LARKWORTHY.